United States Patent [19]
Harris et al.

[11] Patent Number: 6,162,546
[45] Date of Patent: Dec. 19, 2000

[54] UNSATURATED COPOLYMER REACTED WITH SUBSTITUTED P-HYDROXYBENZOIC ACID AND CROSSLINKER

[75] Inventors: Paul J. Harris; John W. Rehfuss, both of West Bloomfield; Gregory G. Menovcik, Farmington Hills; Robert J. Taylor, Jr., Northville; Donald L. St. Aubin, Commerce Township, all of Mich.

[73] Assignee: BASF Corporation, Southfield, Mich.

[21] Appl. No.: 08/904,279

[22] Filed: Jul. 31, 1997

[51] Int. Cl.[7] .......................... B32B 15/08; B32B 27/08; B32B 27/30; C08L 33/14

[52] U.S. Cl. .......................... 428/413; 428/414; 428/416; 428/418; 428/424.4; 428/461; 428/463; 428/502; 428/520; 428/522; 525/69

[58] Field of Search .................... 428/424.4, 413, 428/414, 416, 418, 461, 463, 502, 520, 522; 525/127, 131, 450, 451, 455, 69

[56] References Cited

U.S. PATENT DOCUMENTS

| | | | |
|---|---|---|---|
| 4,181,642 | 1/1980 | Holle et al. | 525/170 |
| 5,393,840 | 2/1995 | Kuo | 525/159 |
| 5,596,043 | 1/1997 | Harris et al. | 525/127 |
| 5,866,259 | 2/1999 | Harris et al. | 428/424.4 |

FOREIGN PATENT DOCUMENTS

| | | |
|---|---|---|
| 50-033226 | 3/1975 | Japan . |
| 51-006231 | 1/1976 | Japan . |

*Primary Examiner*—Robert E. L. Sellers

[57] ABSTRACT

The present invention relates to a modified crosslinkable resin and a composite coating composition or system employing the resin. More particularly, the resin comprises an ethylenically unsaturated monomer or copolymer and para-hydroxybenzoic acid or substituted para-hydroxybenzoic acid, the reaction product thereof subsequently being reacted with a crosslinking agent gives rise to a composition including an ether linkage with a carbon-carbon site ortho to the phenolic hydroxy group.

12 Claims, No Drawings

UNSATURATED COPOLYMER REACTED WITH SUBSTITUTED P-HYDROXYBENZOIC ACID AND CROSSLINKER

FIELD OF THE INVENTION

The present invention relates to modified crosslinkable resins useful for the preparation of environmental etch resistant coatings. More particularly, ethylenically unsaturated monomers or copolymers are reacted with para-hydroxybenzoic acid or substituted para-hydroxybenzoic acid to form unique crosslinking sites, and further reacted with an aminoplast crosslinker to exhibit an ether linkage with a carbon-carbon site ortho to the phenolic hydroxy group.

BACKGROUND OF THE INVENTION

Clear coats have become increasingly popular as coatings for painted articles such as automobile body panels. Not only do clear coats generally have excellent gloss, but they also generally offer enhanced resistance to etching and scratching. Color-plus-clear composite coatings are also widely utilized in the coatings art. They are particularly desirable where exceptional gloss, depth of color, distinctiveness of image, or special metallic effects are desired. Such coatings, however, require an extremely high degree of clarity in the clear coat to achieve the desired visual effect. As such, the clear coat of a color-plus-clear composite coating is especially susceptible to a phenomenon known as environmental etch. Environmental etch manifests itself as spots or marks on or in the clear finish of the coating that cannot be rubbed out.

It is often difficult to predict the degree of resistance to environmental etch that a clear coat will exhibit. Many coating compositions known for their durability and/or weatherability when used in exterior paints, such as high-solid enamels, do not provide the desired level of resistance to environmental etch when used as the clear coat of a color-plus-clear composite coating.

Many compositions have been proposed for use as the clear coat of a color-plus-clear composite coating, such as polyurethanes, acid-epoxy systems and the like. Many prior art systems, however, suffer from disadvantages such as coatability problems, compatibility problems with the pigmented base coat, and solubility problems, for example.

Coating finishes, particularly exterior coating finishes in the automotive industry, are generally applied in two or more distinct layers. Usually one or more layers of primer coating composition is applied to the uncoated substrate first, followed by one or more top coat layers, such as the clear coat layers referred to above. Each of the layers provides important properties toward the durability and appearance of the composite coating. The primer layer may serve a number of purposes, such as promoting adhesion between the substrate and the coating. Additionally, the primer coating may be applied in order to improve physical properties of the coating, such as corrosion resistance or impact strength, or to improve the appearance of the coating by providing a smooth layer upon which the top coat layers may be applied.

Attempts in the prior art to enhance strength, hardness, and etch resistance have utilized modified, crosslinkable acrylic, polyester and alkyd resins. For example, advances in liquid crystal technology have been adapted for the coatings industry, with considerable emphasis being placed on imparting amorphous polymers with liquid crystal character. In this regard, U.S. Pat. No. 5,218,045 focuses on incorporating favorable high $T_g$ characteristics to low $T_g$ resins through the use of mesogenic groups, those containing two or more aromatic rings linked in the para position, particularly para-hydroxybenzoic acid. Thus, covalently binding mesogenic groups to typical amorphous polymers, such as carboxylic acid functional acrylic resins and alkyd resins, has been purported to result in harder coatings.

U.S. Pat. No. 5,393,840 relates to generating a polymer of optimal qualities by blending phenol-functional polyesters and hydroxyl-functional acrylic copolymers. The invention focused on merging the qualities of both polymers, where polyesters have good impact resistance and acrylics have good weatherability. Furthermore, in using a phenol-functional polyester, acid-etch or environmental etch resistance was said to be imparted to polyester coatings.

Attempts have also been made to address the problem in the coatings art wherein the ether linkage formed during the cure of a standard hydroxyl functional polymer with melamine results in a relatively weak link which can cause degradation. In this regard, it has been proposed to produce a urethane linkage upon curing with melamine based on a carbamate/melamine cure system.

The present invention is directed to a significantly different approach to eliminate weak ether linkages by providing a resin, preferably an ethylenically unsaturated monomer or copolymer, and most preferably an acrylic resin, modified by para-hydroxybenzoic acid or substituted para-hydroxybenzoic acid which may be utilized in a curable crosslinkable composite coating composition. The prior art does not appear to disclose the use of a hydroxyl-functional ethylenically unsaturated monomer or copolymer resin that is modified by para-hydroxybenzoic acid and thereafter cured by an aminoplast crosslinker to form a carbon-carbon site ortho to the phenolic hydroxy group.

Thus, the present invention fulfills a need in the art for coating compositions and, more particularly, clear coat and primer systems that greatly reduce, and more preferably eliminate, degradation of film properties while simultaneously offering good weatherability and improved environmental etch resistance.

SUMMARY OF THE INVENTION

It has now been discovered that hydroxyl-functional resins, preferably ethylenically unsaturated resins, can be utilized in primer and/or clear coat layers of coating compositions or systems to eliminate standard weak ether linkages typically employed in the art. Thus, according to the present invention, there is provided a crosslinkable resin, wherein the resin is the reaction product of an ethylenically unsaturated copolymer, and a compound selected from the group consisting of para-hydroxybenzoic acid, substituted para-hydroxybenzoic acid, and mixtures thereof, to give a modified crosslinkable resin having an improved linking group. The invention also provides a modified crosslinked resin, wherein the resin is the result of reacting an ethylenically unsaturated copolymer, a compound selected from the group consisting of para-hydroxybenzoic acid, substituted para-hydroxybenzoic acid, and mixtures thereof, and optionally, but preferably, further with a crosslinking agent.

The present invention also relates to a composite coating composition or system applied to a substrate, wherein the composition comprises: a) a primer layer; and b) a clear coat layer applied to a primer layer; wherein at least one of a) or b) comprises a modified crosslinked resin resulting from the reaction of an ethylenically unsaturated copolymer, a compound selected from the group consisting of para-hydroxybenzoic acid, substituted para-hydroxybenzoic acid, and mixtures thereof, and further with a crosslinking agent.

The present invention further relates to a primer coating composition or system comprising a modified crosslinkable resin, wherein the resin results from the reaction of: an ethylenically unsaturated copolymer, and a compound selected from the group consisting of para-hydroxybenzoic acid, substituted para-hydroxybenzoic acid, and mixtures thereof. The present invention additionally relates to a clear coat coating composition comprising a modified crosslinkable resin, wherein the resin results from the reaction of an ethylenically unsaturated copolymer, and a compound selected from the group consisting of para-hydroxybenzoic acid, substituted para-hydroxybenzoic acid, and mixtures thereof.

DETAILED DESCRIPTION OF THE PREFERRED EMBODIMENT

The present invention relates to a modified crosslinkable resin, wherein the resin is the reaction product of an ethylenically unsaturated copolymer, and a compound selected from the group consisting of para-hydroxybenzoic acid, substituted para-hydroxybenzoic acid, and mixtures thereof, having the following structure:

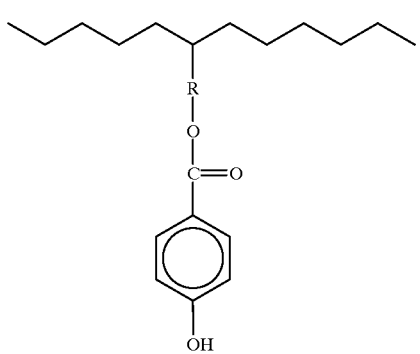

I wherein R is a non-weak ester side chain linking group of the resin preferably based on an ethylenically unsaturated copolymer, and mixtures thereof.

The improved linking group, R, of the resin can be made up of various groups, depending on the copolymer employed in the invention. The linking group R is preferably based on ethylenically unsaturated copolymers; however, the linking group can be derived from any resin. Examples of ethylenically unsaturated copolymers useful in the compositions and methods of the present invention, whose side chains are useful as linking groups, include acrylic resins polymerized from glycidyl acrylate, glycidyl methacrylate. In addition, allyl glycidyl ether may also be used as a monomer or copolymer for a modified crosslinkable resin wherein the linking group R is —CH$_2$OCH$_2$CH(OH)CH$_2$—.

The resins useful in the practice of the present invention will preferably have an average molecular weight of between about 2,000 to about 10,000, more preferably between about 4,000 to 8,000, and still more preferably about 6,000. Molecular weight can preferably be determined by the GPC method using a polystyrene standard.

The hydroxyl content of the resins of the present invention, on a molecular weight per equivalent of hydroxyl functionality, will generally be between about 100 to about 500, more preferably between about 200 and 400, and still more preferably about 300. The glass transition temperature, $T_g$, of the para-hydroxybenzoic acid modified resin and crosslinking agent can be adjusted to achieve a cured coating having the $T_g$ for the particular application involved.

In another embodiment, the modified crosslinkable resins of the present invention are preferably further reacted with a crosslinking agent, such as an aminoplast resin, for example, to give rise to a modified crosslinked resin. The modified crosslinked resin preferably has the following structure:

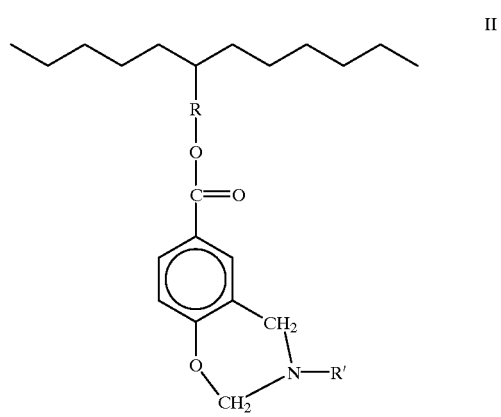

II wherein R is selected from the group consisting of —COOCH$_2$CH(OH)CH$_2$—, —CH$_2$OCH$_2$CH(OH)CH$_2$—, and mixtures thereof, and R' is a non-functional crosslinking segment selected from the group consisting of triazines, ureas, carbamates, and mixtures thereof.

The modified crosslinked resin preferably exhibits an ether linkage and a carbon-carbon site ortho to the phenolic hydroxy group to form a cyclic arrangement on the aromatic ring as shown above in structure II. The positions ortho to the phenolic group are positions 3 and 5 on the aromatic ring of the resin, where the carboxylic acid group is position 1 and the phenolic group is position 4. The crosslinking agent, however, may attach to the aromatic ring of the para-hydroxybenzoic acid at various positions, resulting in at least six different configurations of the resin. The configurations include attaching the crosslinker at positions selected from the group consisting of 3, 4, 5, and mixtures thereof.

The aromatic ring of para-hydroxybenzoic acid may include various substituents at the positions ortho to the carboxylic acid group, including halogens, alkyls, —OH, —OCH$_3$, —NHCOCH$_3$, —C$_6$H$_5$, —NH$_2$, and mixtures thereof. These substituents are commonly known in the art as ortho, para directors.

Suitable aminoplast resin crosslinkers are amine/aldehyde condensates, preferably at least partially etherified, and most preferably fully etherified. Melamine and urea are preferred amines, but others such as triazines, triazoles, diazines, guanidines, or guanamies may also be used to prepare the alkylated amine/aldehyde aminoplast resin crosslinking agents. The aminoplast resins are preferably amine/formaldehyde condensates, although other aldehydes, such as acetaldehyde, crotonaldehyde, and benzaldehyde, may be used. Nonlimiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxymethylmelamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are commercially available, for example, from Monsanto Corp., St. Louis, Mo., under the trademark RESIMENE or Cytec Industries, Stamford, Conn., under the trademark CYMEL.

The crosslinking agents of the present invention may also be epoxy-based crosslinkers. Examples of epoxy crosslinkers include, but are not limited to, epoxy-functional epoxy resins, such as novolac epoxy resins, bisphenol A-type epoxy resins, and alicyclic epoxy resins.

The crosslinking agent of the present invention may be alkoxylated bis-carbamates, commercially available, for example, from BASF Lacke +Farben AG, Germany, under the trademark PLASTOPALS.

The crosslinking agent of the present invention additionally may be a polyisocyanate crosslinking agent, preferably an aliphatic or cycloaliphatic polyisocyanate. Aliphatic polyisocyanates are preferred because of the better color and resistance to UV degradation of aliphatic polyisocyanates as compared to aromatic polyisocyanates. Illustrative polyisocyanate crosslinkers include, without limitation, aliphatic diisocyanates such as 1, 2-diisocyanatopropane, 1, 3-diisocyanatopropane, 1, 2-butylene diisocyanate, 1, 3-butylene diisocyanate, 1, 4-butylene diisocyanate, 2, 3-butylene diisocyanate, lysine diisocyanate, 4, 4'-methylenebis (cyclohexyl isocyanate), isophorone diisocyanate, diisocyanatocyclohexane, pentamethylene diisocyanate, hexamethylene diisocyanate, 2, 2, 4- and 2, 4, 4-trimethylhexamethylene diisocyanate, and biurets, allophanates, and isocyanurates of these. Especially preferred are the isocyanurates of hexamethylene diisocyanate or of isophorone diisocyanate, and mixtures of these isocyanates. Commercial polyisocyanates are available, for example from Bayer, Pittsburgh, Pa., and Hüls, Piscataway, N.J.

It is also useful to react excess diisocyanate with a polyol to form a polyisocyanate crosslinker. Preferably the polyisocyanate product of this reaction is monomeric. For example, useful crosslinking agents can be made by reacting two equivalents of a diisocyanate (such as hexamethylene diisocyanate) with one equivalent of a polyol (such as ethylene glycol, propylene glycol, 1, 4-butanediol, 1, 6-hexanediol, neopentyl glycol, trimethypentanediol cyclohexanedimethanol, glycerol, trimethylopropane, trimethylolethane, pentaerythritol, or mixtures of these). The reaction between polyisocyanate and polyol may be carried out neat or in solution, and may optionally use a catalyst, such as organotin catalyst, dibutyltin dilaurate, dibutyltin diacetate, and the like.

The polyisocyanate crosslinking agents are preferably blocked with compounds such as phenols, caprolactam, low molecular weight oximes such as acetone oxime, methyl ketoxime, cyclohexanone oxime, acetophenone oxime, that will allow the polyisocyanate crosslinking agent to be formulated into a stable composition. Methyl ethyl ketoxime and acetone oxime are preferred for their low unblocking temperatures.

The coating compositions may also include conventional art-disclosed additives, such as a pigment, color pigments, flake pigments, filler pigments, and the like. Illustrative examples of these are azo reds, quinacridone reds and violets, perylene reds, copper phthalocyanine blues and greens, carbazole violet, monoarylide and diarylide yellows, tolyl and naphthol oranges, metal oxides, chromates, molybdates, phosphates, and silicates, silicias, aluminums, micas, and bronzes. While flake pigments are usually stirred in as a slurry, other pigments are generally dispersed with resins or dispersants and solvent to form pigment pastes, using equipment, such as attritors and sand mills, and methods widely-used in the art.

A solvent may optionally be utilized in the clear coat and primer layer compositions or systems used in the practice of the present invention. Although the composition used according to the present invention may be utilized, for example, in the form of substantially solid powder, or a dispersion, it is often desirable that the composition be in a substantially liquid state, which is accomplished with the use of a solvent. This solvent should preferably act as a solvent with respect to both the hydroxyl-functional modified acrylic resin and the crosslinking agent.

In general, depending on the solubility characteristics of the components of the coating composition, the solvent can be any organic solvent and/or water. In one preferred embodiment, the solvent is a polar organic solvent. More preferably, the solvent is a polar aliphatic solvent or polar aromatic solvent. Still more preferably, the solvent is a ketone, ester, acetate, aprotic amide, aprotic sulfoxide, or aprotic amine. Examples of useful solvents include, in a non-limiting manner, methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The invention also relates to a composite coating composition or system that is applied to a substrate, wherein the composition or system comprises: a) a primer layer; and b) a clear coat layer applied to the primer layer; wherein at least one of a) or b) comprises a modified crosslinked resin resulting from the reaction of:

1) an ethylenically unsaturated copolymer;
2) a compound selected from the group consisting of para-hydroxybenzoic acid, substituted para-hydroxybenzoic acid, and mixtures thereof; and
3) a crosslinking agent;
wherein the crosslinking agent attaches to para-hydroxybenzoic acid or substituted para-hydroxybenzoic acid at positions selected from the group consisting of 3, 4, 5, and mixtures thereof. The modified resin of at least one of a) or b) has the following preferred structure:

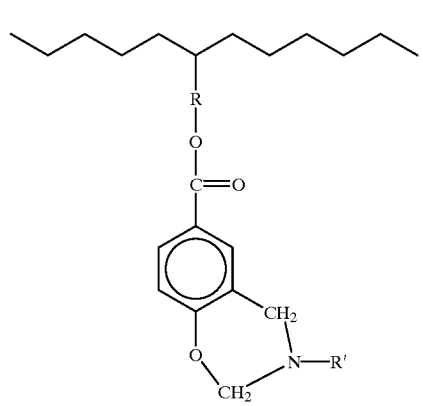

III

In structure III, R is a non-weak side chain linking group of the resin preferably based on an ethylenically unsaturated copolymer; wherein R may be —COOCH$_2$CH(OH)CH$_2$—, —COOCH₃—, —COOCH₂CH(C₂H₅)C₄H₉—, —C₆H₄—, —CH₂OCH₂CH(OH)CH₂—, and mixtures thereof; and R' is a non-functional segment selected from the group consisting of triazines, ureas, carbamates, and mixtures thereof.

As set forth above, the crosslinking agent, preferably an aminoplast crosslinker, may attach to the aromatic ring of the acid at various positions. The crosslinking agent, however, may also be an epoxy crosslinker.

The invention further relates to a primer coating composition/system or clear coating composition/system comprising a modified crosslinkable resin which is the result of reacting a compound an ethylenically unsaturated copolymer, and a compound selected from the group consisting of para-hydroxybenzoic acid, substituted para-hydroxybenzoic acid, and mixtures thereof.

Although any resin may be employed, the preferred resin used in a clear coat coating composition/system or primer coating composition/system is an ethylenically unsaturated monomer or copolymer, most preferably an acrylic resin. The copolymer may be, but is not limited to acrylic resins polymerized from, glycidyl acrylate, glycidyl methacrylate, allyl glycidyl ether, and mixtures thereof.

The composite coating composition or system may further include conventional art-disclosed additives such as pigments, where the clear coat layer comprises a top clear coat layer and a pigmented base coat layer.

Pigmented base coat compositions of the base coat/clear coat composite coatings or systems are well-known in the art, and do not require explanation in detail herein. Polymers known in the art to be useful in base coat compositions include acrylics, vinyls, polyurethanes, polycarbonates, polyesters, alkyds, and polysiloxanes. Preferred polymers include acrylics and polyurethanes. In one preferred embodiment of the present invention, the base coat composition also utilizes a hydroxyl-functional resin, including a crosslinkable resin comprising an ethylenically unsaturated monomer or copolymer reacted with para-hydroxybenzoic acid or substituted para-hydroxybenzoic acid to give a modified crosslinkable resin.

Other crosslinkable functional groups used for base coat polymers include isocyanate, amine, epoxy, acrylate, vinyl, silane, and acetoacetate groups. These groups may be blocked or masked in such a way that they are unblocked and available for the crosslinking reaction under the desired curing conditions, generally elevated temperatures. The crosslinking agent, as set forth above, may be an aminoplast resin, isocyanate and blocked isocyanate (including isocyanurates), and acid or anhydride functional crosslinking agents.

Coating compositions can be coated on the substrate by any of a number of techniques well-known in the art. These include, for example, spray coating, dip coating, roll coating, curtain coating, and the like. For automotive body panels, spray coating is preferred.

After an article is coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative sources. Curing temperatures will vary depending on the particular blocking groups used in the crosslinking agents, however, they generally range between 97° C. and 177° C. and are preferably between 121° C. and 141° C. The curing time will also vary depending on the particular components and physical parameters used, such as the thickness of the layers; however, typical curing times range from 15 to 60 minutes.

The average $T_g$ of the components of the cured film should be between +50° C. and 100° C., with the individual $T_g$s being adjusted to achieve optimum performance.

The invention is further described in the following examples.

PREPARATION 1

HYDROXYL-FUNCTIONAL ACRYLIC RESIN

A three-necked 5-1 round bottom flask was fitted with an agitator at the center neck and a thermal couple at one of the side necks to monitor the reaction temperature. A nitrogen purge line was also fed through this neck. The second side neck was fitted with a Claissen adaptor and water cooled condenser.

1030 g of propylene glycol monomethyl ether were charged to the flask and heated to reflux with a nitrogen purge to 106° C.

207 g VAZO 67, 1170 g glycidyl methacrylate, 130 g methyl methacrylate, 800 g 2-ethylhexyl acrylate, and 480 g styrene were charged to a separate container. This mixture was pumped to the refluxing solvents over a period of approximately 4 hours. 80 g propylene glycol monomethyl ether was flushed through the pump and into the reaction mixture. 39 g VAZO 67 and 90 g propylene glycol monomethyl ether were mixed and flushed through the system. The reaction mixture was then held at reflux, 108° C. for 1.5 hours.

After this hold period, 4026 g acrylic resin with 1307.3 g para-hydroxybenzoic acid was heated to 130° C. The mixture was held at this temperature until the epoxy equivalent weight, as determined by titration, was approximately 0.

EXAMPLE 1

A clear coat formulation is prepared by combining the following materials in a conventional manner under agitation at a rate allowable by the process:

| Raw Materials | | Amount wt. | | Manufacture & Description |
|---|---|---|---|---|
| CPR27839 | 119.97 | 112.91 | 105.86 | BASF Acrylic resin reacted with para-hydroxybenzoic acid |
| Resimene 717 | 17.86 | 23.81 | 29.76 | Monsanto polymeric amino resin crosslinker |
| PBA | 0.25 | 0.25 | 0.25 | Cook Composites & Polymer Co. flow additive |
| Butyl Cellosolve | 25.59 | 26.70 | 27.80 | Eastman Ektasolve EB butyl cellosolve |
| Total Amount wt. | 163.67 | 163.67 | 163.67 | |

EXAMPLE 2

A clear coat formulation is prepared by combining the following materials in a conventional manner under agitation at a rate allowable by the process:

| Raw Materials | Amount wt. | | | Manufacture & Description |
|---|---|---|---|---|
| CPR27839 | 119.97 | 112.91 | 105.86 | BASF Acrylic resin reacted with para-hydroxybenzoic acid |
| Resimene 755 | 15.00 | 20.00 | 25.00 | Monsanto monomeric amino resin crosslinker Resimene 755 |
| Acid Catalyst | 5.41 | 5.41 | 5.41 | King Industries Nacure 5528 amine salt of aromatic sulfonic acid |
| PBA | 0.25 | 0.25 | 0.25 | Cook Composites & Polymer Co. flow additive |
| Butyl Cellosolve | 25.73 | 27.79 | 29.84 | Eastman Ektasolve EB butyl cellosolve |
| Total Amount wt. | 166.36 | 166.36 | 166.36 | |

EXAMPLE 3

A clear coat formulation is prepared by combining the following materials in a conventional manner agitation at a rate allowable by the process:

| Raw Materials | Amount wt. | | | Manufacture & Description |
|---|---|---|---|---|
| CPR27836 | 137.38 | 129.30 | 121.22 | BASF Acrylic resin reacted with para-hydroxybenzoic acid |
| Resimene 717 | 17.86 | 23.81 | 29.76 | Monsanto polymeric amino resin crosslinker |
| PBA | 0.25 | 0.25 | 0.25 | Cook Composites & Polymer Co. Flow additive |
| Butyl Cellosolve | 8.18 | 10.31 | 12.44 | Eastman Ektasolve EB butyl cellosolve |
| Total Amount wt. | 163.67 | 163.67 | 163.67 | |

EXAMPLE 4

A clear coat formulation is prepared by combining the following materials in a conventional manner under agitation at a rate allowable by the process:

| Raw Materials | Amount wt. | | | Manufacture & Description |
|---|---|---|---|---|
| CPR27836 | 137.38 | 129.30 | 121.22 | BASF Acrylic resin reacted with para-hydroxybenzoic acid |
| Resimene 755 | 15.00 | 20.00 | 25.00 | Monsanto monomeric amino resin crosslinker Resimene 755 |
| Acid Catalyst | 5.41 | 5.41 | 5.41 | King Industries Nacure 5528 amine salt of aromatic sulfonic acid |
| PBA | 0.25 | 0.25 | 0.25 | Cook Composites & Polymer Co. flow additive |
| Butyl Cellosolve | 8.32 | 11.41 | 14.48 | Eastman Ektasolve EB butyl cellosolve |
| Total Amount wt. | 166.36 | 166.37 | 166.36 | |

EXAMPLE 5

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Resimene 755 | 14.90 | Monsanto formaldehyde melamine resin |
| Acrylic | 49.50 | BASF Acrylic resin containing para-Hydroxybenzoic functionality |
| Acid Catalyst | 1.70 | King Industries Nacure 5543 amine salt of aromatic sulfonic acid |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 6

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Cymel 327 | 14.90 | Cyanamid polymeric formaldehyde melamine resin |
| Acrylic | 49.50 | BASF Acrylic resin containing para-Hydroxybenzoic acid |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 7

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Resimene 755 | 18.90 | Monsanto formaldehyde melamine resin |
| Acrylic | 45.50 | BASF Acrylic resin containing para-Hydroxybenzoic functionality |
| Acid Catalyst | 1.70 | King Industries Nacure 5543 amine salt of aromatic sulfonic acid |

-continued

| Raw Materials | Amount wt. | Manufacture & Description |
|---|---|---|
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 8

A primer formulation is prepared by combining the following materials in a conventional manner under agitation at a rate allowable by the process:

| Raw Materials | Amount wt. | Manufacture & Description |
|---|---|---|
| Resimene 755 | 10.95 | Monsanto formaldehyde melamine resin |
| Acrylic | 18.50 | BASF Acrylic resin containing para-Hydroxybenzoic functionality |
| Fumed Silica | 1.50 | BASF dispersion of Fumed Silica rheology control agent |
| PBA | 0.15 | Cook Composites & Polymers Co. Polybutylacrylate flow additive |
| Acid Catalyst | 2.10 | King Industries Nacure 5528 amine salt of aromatic sulfonic acid |
| N-Butyl Alcohol | 3.60 | Eastman N-Butyl alcohol |
| N-Butyl Acetate | 8.67 | Eastman N-Butyl Acetate |
| Inert pigment filler | 41.67 | BASF inert pigment dispersion of Bentone SD-2 |
| Black pigment dispersion | 1.80 | BASF black pigment dispersion |
| White pigment dispersion | 0.78 | BASF white pigment dispersion |
| Inert pigment filler | 1.40 | BASF inert pigment filler for rheology control |
| Primaryamyl Acetate | 8.88 | Union Carbide Primaryamyl Acetate mixed isomers |

EXAMPLE 9

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker CPR35134 | 14.90 | BASF epoxy functional x-linking resin |
| Acrylic | 49.50 | BASF Acrylic resin containing para-Hydroxybenzoic functionality |
| Catalyst | 1.70 | Triphenylphosphine |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 10

A clear coat formulation is prepared by combining the following materials in a conventional manner under agitation at a rate allowable by the process:

| Raw Materials | Amount wt. | Manufacture & Description |
|---|---|---|
| N-Butyl | 3.80 | Eastman N-Butyl alcohol |
| Epoxy x-linker CPR35134 | 10.90 | BASF epoxy functional x-linking resin |
| Catalyst | 1.70 | N,N-Dimethylbenzylamine |
| Acrylic | 49.50 | BASF Acrylic resin containing para-Hydroxybenzoic functionality |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 11

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker CPR35134 | 10.90 | BASF epoxy functional x-linking resin |
| Catalyst | 0.50 | N,N-Dimethylbenzylamine |
| Acrylic | 49.50 | BASF Acrylic resin containing para-Hydroxybenzoic functionality |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl | 2.06 | Eastman N-Butyl alcohol |

EXAMPLE 12

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker | 14.90 | Tetraglycidyl ether of tetrakis(4-hydroxyphenyl)ethane Araldite 0163 Union Carbide |
| Acrylic | 49.50 | BASF Acrylic resin containing para-Hydroxybenzoic functionality |
| Catalyst | 0.70 | N,N-Dimethylbenzylamine |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 13

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker | 10.90 | Tetraglycidyl ether of tetrakis(4-hydroxyphenyl)ethane Araldite 0163 |
| Catalyst | 0.30 | N,N-Dimethylbenzylamine |
| Acrylic | 49.50 | BASF Acrylic resin containing para-Hydroxybenzoic functionality |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 14

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker | 14.90 | Tetraglycidyl ether of tetrakis(4-hydroxyphenyl)ethane Araldite 0163 Union Carbide |
| Acrylic | 49.50 | BASF Acrylic resin containing para-Hydroxybenzoic functionality |
| Catalyst | 1.70 | N,N-Dimethylbenzylamine |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 15

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker | 10.90 | Tetraglycidyl ether of tetrakis(4-hydroxyphenyl)ethane Araldite 0163 |
| Catalyst | 1.70 | Triphenylphosphine |
| Acrylic | 49.50 | BASF Acrylic resin containing para-Hydroxybenzoic functionality |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 16

A clear coat formulation is prepared by combining the following materials in a conventional manner under agitation at a rate allowable by the process:

| Raw Materials | Amount wt. | Manufacture & Description |
|---|---|---|
| N-Butyl Alcohol | 3.80 | Eastman N-Butyl alcohol |
| Epoxy x-linker CPR35134 | 14.90 | BASF epoxy functional x-linking resin |
| Acrylic | 49.50 | BASF Acrylic resin containing para-Hydroxybenzoic functionality |
| Catalyst | 0.70 | N,N-Dimethylbenzylamine |
| Fumed Silica | 13.50 | BASF dispersion of Fumed Silica rheology control agent |
| Tinuvin 123 | 1.20 | Ciba hindered amine light stabilizer |
| Tinuvin 1130 | 2.34 | Ciba ultraviolet light absorber |
| PBA | 0.45 | Cook Composites & Polymers Co. Polybutylacrylate flow additive |
| N-Butyl Acetate | 5.67 | Eastman N-Butyl Acetate |
| Primaryamyl Acetate | 4.88 | Union Carbide Primaryamyl Acetate mixed isomers |
| N-Butyl Alcohol | 2.06 | Eastman N-Butyl alcohol |

EXAMPLE 17

A primer formulation is prepared by combining the following materials in a conventional manner under agitation at a rate allowable by the process:

| Raw Materials | Amount wt. | Manufacture & Description |
|---|---|---|
| Epoxy x-linker CPR35134 | 10.95 | BASF epoxy functional x-linker resin |
| Acrylic | 18.50 | BASF Acrylic resin containing para-Hydroxybenzoic functionality |
| Fumed Silica | 1.50 | BASF dispersion of Fumed Silica rheology control agent |
| PBA | 0.15 | Cook Composites & Polymers Co. Polybutylacrylate flow additive |
| Catalyst | 2.10 | Triphenylphosphine |
| N-Butyl Alcohol | 3.60 | Eastman N-Butyl alcohol |
| N-Butyl Acetate | 8.67 | Eastman N-Butyl Acetate |
| Inert pigment filer | 41.67 | BASF inert pigment dispersion of Bentone SD-2 |
| Black pigment dispersion | 1.80 | BASF black pigmented dispersion |
| White pigment dispersion | 0.78 | BASF white pigment dispersion |
| Inert pigment filler | 1.40 | BASF inert pigment filler for rheology control |
| Primaryamyl Acetate | 8.88 | Union Carbide Primaryamyl Acetate mixed isomers |

EXAMPLE 18

A primer formulation is prepared by combining the following materials in a conventional manner under agitation at a rate allowable by the process:

| Raw Materials | Amount wt. | Manufacture & Description |
|---|---|---|
| Epoxy x-linker CPR35134 | 10.95 | BASF epoxy functional x-linker resin |
| Acrylic | 18.50 | BASF Acrylic resin containing para-Hydroxybenzoic functionality |
| Fumed Silica | 1.50 | BASF dispersion of Fumed Silica rheology control agent |
| PBA | 0.15 | Cook Composites & Polymers Co. Polybutylacrylate flow additive |
| Catalyst | 2.10 | N,N-Dimethyl-benzylamine |
| N-Butyl Alcohol | 3.60 | Eastman N-Butyl alcohol |
| N-Butyl Acetate | 8.67 | Eastman N-Butyl Acetate |
| Inert pigment filer | 41.67 | BASF inert pigment dispersion of Bentone SD-2 |
| Black pigment dispersion | 1.80 | BASF black pigmented dispersion |
| White pigment dispersion | 0.78 | BASF white pigment dispersion |
| Inert pigment filler | 1.40 | BASF inert pigment filler for rheology control |
| Primaryamyl Acetate | 8.88 | Union Carbide Primaryamyl Acetate mixed isomers |

EXAMPLE 19

A primer formulation is prepared by combining the following materials in a conventional manner under agitation at a rate allowable by the process:

| Raw Materials | Amount wt. | Manufacture & Description |
|---|---|---|
| Epoxy x-linker | 10.95 | Tetraglycidyl ether of tetrakis(4-hydroxyphenyl)ethane Araldite 0163 Union Carbide |
| Acrylic | 18.50 | BASF Acrylic resin containing para-Hydroxybenzoic functionality |
| Fumed Silica | 1.50 | BASF dispersion of Fumed Silica rheology control agent |
| PBA | 0.15 | Cook Composites & Polymers Co. Polybutylacrylate flow additive |
| Catalyst | 2.10 | Triphenylphosphine |
| N-Butyl Alcohol | 3.60 | Eastman N-Butyl alcohol |
| N-Butyl Acetate | 8.67 | Eastman N-Butyl Acetate |
| Inert pigment filer | 41.67 | BASF inert pigment dispersion of Bentone SD-2 |
| Black pigment dispersion | 1.80 | BASF black pigmented dispersion |
| White pigment dispersion | 0.78 | BASF white pigment dispersion |
| Inert pigment filler | 1.40 | BASF inert pigment filler for rheology control |
| Primaryamyl Acetate | 8.88 | Union Carbide Primaryamyl Acetate mixed isomers |

EXAMPLE 20

A primer formulation is prepared by combining the following materials in a conventional manner under agitation at a rate allowable by the process:

| Raw Materials | Amount wt. | Manufacture & Description |
|---|---|---|
| Epxoy x-linker | 10.95 | Tetraglycidyl ether of tetrakis(4-hydroxyphenyl)ethane Araldite 0163 Union Carbide |
| Acrylic | 18.50 | BASF Acrylic resin containing para-Hydroxybenzoic functionality |
| Fumed Silica | 1.50 | BASF dispersion of Fumed Silica rheology control agent |
| PBA | 0.15 | Cook Composites & Polymers Co. Polybutylacrylate flow additive |
| Catalyst | 2.10 | N,N-Dimethyl benzylamine |
| N-Butyl Alcohol | 3.60 | Eastman N-Butyl alcohol |
| N-Butyl Acetate | 8.67 | Eastman N-Butyl Acetate |
| Inert pigment filer | 41.67 | BASF inert pigment dispersion of Bentone SD-2 |
| Black pigment dispersion | 1.80 | BASF black pigmented dispersion |
| White pigment dispersion | 0.78 | BASF white pigment dispersion |
| Inert pigment filler | 1.40 | BASF inert pigment filler for rheology control |
| Primaryamyl Acetate | 8.88 | Union Carbide Primaryamyl Acetate mixed isomers |

What is claimed is:

1. A composite coating composition or system applied to a substrate, wherein the composition or system comprises:
   a) a primer layer; and
   b) a clear coat layer applied to the primer layer, wherein at least one of a) or b) comprises a modified crosslinked resin resulting from the reaction of:
   1) an acrylic resin containing a group reactive with para-hydroxybenzoic acid or substituted para-hydroxybenzoic acid which is reacted with
   2) a compound selected from the group consisting of para-hydroxybenzoic acid, substituted para-hydroxybenzoic acid, and mixtures thereof; and
   3) a crosslinking agent; wherein the para-hydroxybenzoic acid or substituted para-hydroxybenzoic acid is reacted with the acrylic resin, and the crosslinking agent reacts with para-hydroxybenzoic acid or substituted para-hydroxybenzoic acid at positions selected from the group consisting of 3, 4, 5, and mixtures thereof, to form a crosslinked resin.

2. The composite coating composition of claim 1, wherein the modified crosslinked resin in at least one of a) or b) has the following structure:

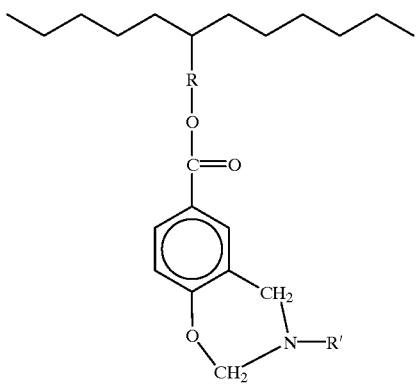

wherein R is a side chain linking group on the acrylic resin and R' is a non-functional segment.

3. The composite coating composition of claim 1, wherein the ethylenically unsaturated copolymer is selected from the group consisting of glycidyl acrylate, glycidyl methacrylate, allyl glycidyl ether, and mixtures thereof.

4. The composite coating composition of claim 1, wherein the crosslinking agent is an epoxy resins.

5. The composite coating composition of claim 1, wherein the clear coat layer comprises a clear top coat layer and a pigmented base coat layer.

6. The composite coating of claim 2, wherein R is selected from the group consisting of —COOH$_2$CH(OH)CH$_2$—, —CH$_2$OCH$_2$CH(OH)CH$_2$—, and mixtures thereof.

7. The composite coating composition of claim 2, wherein R' is selected from the group consisting of triazines, ureas, carbamates, and mixtures thereof.

8. The composite coating composition of claim 1, wherein the crosslinking agent is an aminoplast.

9. The composite coating composition of claim 8, wherein the aminoplast is selected from the group consisting of monomeric and polymeric melamine resins, partially or fully alkylated monomeric and polymeric melamine resins, urea formaldehyde resins, and mixtures thereof.

10. The composite coating composition of claim 9, wherein the is hexamethoxymethylmelamine.

11. The composite coating composition of claim 1, wherein the substituted para-hydroxybenzoic acid includes substituents selected from the group consisting of halogens, alkyls, —OH, —OCH$_3$, —NHCOCH$_3$, —C$_6$H$_5$, —NH$_2$, and mixtures thereof.

12. The composite coating composition of claim 1, wherein the substrate is an automobile body panel.

* * * * *